(12) United States Patent
Hoff et al.

(10) Patent No.: US 8,918,258 B2
(45) Date of Patent: Dec. 23, 2014

(54) SYSTEM AND METHOD FOR AVOIDING ENGINE UNDERSPEED AND STALL

(71) Applicant: Caterpillar Inc., Peoria, IL (US)

(72) Inventors: Brian D. Hoff, East Peoria, IL (US); Michael Barngrover, Brimfield, IL (US); Mark E. Rettig, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 162 days.

(21) Appl. No.: 13/658,465

(22) Filed: Oct. 23, 2012

(65) Prior Publication Data

US 2014/0095035 A1 Apr. 3, 2014

Related U.S. Application Data

(60) Provisional application No. 61/707,381, filed on Sep. 28, 2012.

(51) Int. Cl.
*B60W 30/18* (2012.01)
*F16H 61/40* (2010.01)

(52) U.S. Cl.
USPC .............................................. 701/60; 477/34

(58) Field of Classification Search
CPC ............. B60W 30/1884; F16H 61/472; B60Y 2300/56
USPC .............................................. 477/34; 701/60
See application file for complete search history.

(56) References Cited

U.S. PATENT DOCUMENTS

| | | | |
|---|---|---|---|
| 6,385,970 B1 * | 5/2002 | Kuras et al. | 60/448 |
| 6,595,885 B1 * | 7/2003 | Lutgen | 475/76 |
| 7,503,173 B2 | 3/2009 | Dong et al. | |
| 7,822,532 B2 * | 10/2010 | Hoff et al. | 701/110 |
| 2003/0228952 A1 | 12/2003 | Joe et al. | |
| 2005/0132702 A1 * | 6/2005 | Dorscht | 60/443 |
| 2009/0156360 A1 * | 6/2009 | Barngrover et al. | 477/111 |
| 2009/0298635 A1 * | 12/2009 | Kuras et al. | 475/53 |
| 2011/0087411 A1 | 4/2011 | Fuller | |
| 2011/0094214 A1 | 4/2011 | Nelson et al. | |

FOREIGN PATENT DOCUMENTS

WO    WO 2004/085190 A1    10/2004

\* cited by examiner

*Primary Examiner* — John Q Nguyen
*Assistant Examiner* — Anshul Sood
(74) *Attorney, Agent, or Firm* — Leydig, Voit & Mayer, Ltd.

(57) ABSTRACT

System and method for controlling a transmission in response to transient torque events are disclosed. The method includes commanding a maximum transmission output torque; comparing the commanded output torque to a feedback torque to determine if they are equal; and incrementally increasing the transmission output torque until equal. A machine and a powertrain include a controller configured to command a maximum negative transmission output torque in response to a transient torque event, and incrementally increase the transmission output torque until such time as the transmission output torque is equal to or within a preset range of the feedback torque.

20 Claims, 6 Drawing Sheets

SYSTEM AND METHOD FOR AVOIDING ENGINE UNDERSPEED AND STALL

CROSS-REFERENCE TO RELATED APPLICATION

This patent application is a nonprovisional of U.S. Provisional Patent Application No. 61/707,381, filed Aug. 28, 2012, which application is hereby incorporated by reference herein.

TECHNICAL FIELD

This patent disclosure relates generally to transmissions appropriate for use in vehicle and machine powertrains and, more particularly, to continuously variable transmissions.

BACKGROUND

Various vehicles or machines such as wheel loaders, cars, trucks and other wheeled machines, use powertrains that include a torque converter between the engine and transmission. The torque converter can be used in a locked or an unlocked mode when the machine is moving, which provides for a desirable torque control feature for some machines that may encounter relatively immovable obstacles. For example, a wheel loader may push a bucket against a pile of material, a ripper may encounter a boulder, and so forth. Torque converter slippage is relied upon to provide a transmission output torque control benefit, for example, when contact with the obstacle is initiated, because it results in limiting transmission input torque and reducing the possibility of low engine lug issues, such as engine underspeed or stalling. However, torque converter slippage and other losses have been found to increase overall fuel consumption of the machine when compared to other power transmission methods such as continuously variable transmissions (CVTs).

CVTs provide a continuously variable torque capability, which is an improvement over a traditional torque converter/transmission powertrains. A typical CVT employs a torque controlling element that provides a continuously variable torque or speed transmission capability. One known application of CVTs for machine use is embodied as a split torque transmission, which includes a drive train that is powered by dual inputs—one input being a torque- or speed-controlled input, such as from a hydraulic variator, and the other being a direct power input from an engine. These two inputs are combined in one or more planetary gear arrangements, each of which includes outputs driving the various gear ratios of the transmission.

Split torque transmissions, however, do not realize the inherent torque control benefits of a torque converter based powertrain. Accordingly, it is desirable to accurately control the variator, especially when rapid changes in the torque passing through the transmission occur, for example, when an obstacle is encountered. Control of the variator under such conditions requires the swift detection of torque changes, which in most current implementations is left to the perception of the operator. Thus, in most current implementations, the operator must cut or reduce machine torque when the operator perceives that an immovable object has been encountered. As can be appreciated, there is a lag time between the instant when the machine begins to encounter the obstacle until the time when the operator has sufficiently reduced the torque command to the transmission and the transmission has adjusted its operation accordingly. This time lag may cause the machine to rock, thus causing operator discomfort, system inefficiency, and/or increased drive train wear. In some instances, such time lag may cause engine underspeed and/or stall.

SUMMARY

In one aspect, the disclosure describes a method for controlling a torque-controlled transmission in response to transient torque events. The method includes commanding a maximum transmission output torque; comparing the commanded transmission output torque to a feedback torque to the transmission; and determining if the commanded transmission output torque is equal to or within a predetermined range of the feedback torque to the transmission. The method further includes sequentially incrementally increasing the commanded transmission output torque if the commanded transmission output torque is not equal to or within the predetermined range of the feedback torque, and again determining if the commanded transmission output torque is equal to or within the predetermined range of the feedback torque until such time as the commanded transmission output torque is equal to or within the predetermined range of the feedback torque.

In another aspect, the disclosure describes a powertrain having an engine connected to a transmission having an output torque and being adapted to drive ground engaging members. The powertrain further includes a controller configured to control operation of the transmission based on a desired output torque of the transmission in response to a transient torque event. In response to a transient torque event, the controller is configured to command maximum negative transmission output torque. The controller is further configured to then compare the maximum negative transmission output torque to a feedback torque from the ground engaging members. If the transmission output torque is not equal to the feedback torque, the controller is configured to incrementally increase the transmission output torque until such time as the transmission output torque is equal to or within a preset range of the feedback torque.

In yet another aspect, the disclosure describes a machine having a frame that supports an engine and is connected to a transmission. The transmission selectively transforms an input engine speed and engine torque to an output transmission speed and transmission torque. The transmission speed and torque are applied to a set of ground engaging members to propel the frame. The machine further includes a controller configured to control operation of the transmission based on a desired output torque of the transmission in response to a transient torque event. In response to a transient torque event, the controller is configured to command maximum negative transmission output torque, and compare the maximum negative transmission output torque to a feedback torque from the ground engaging members. The controller is further configured to incrementally increase the transmission output torque until such time as the transmission output torque is equal to or within a preset range of the feedback torque.

DETAILED DESCRIPTION

This disclosure relates to transmission controls and, more particularly, to an arrangement for controlling a continuously variable transmission (CVT) to minimize the opportunity for low engine speed lug issues when transient shifts in the torque passing through the transmission are detected. The disclosed methods and systems may be applicable not only to the CVT transmissions described in the disclosed embodiments, but to any other types of transmissions that may be operating in a torque-controlled fashion. In the description that follows, CVTs are discussed but it should be appreciated that any type of transmission operating in a torque-controlled fashion is contemplated.

Figure 1:
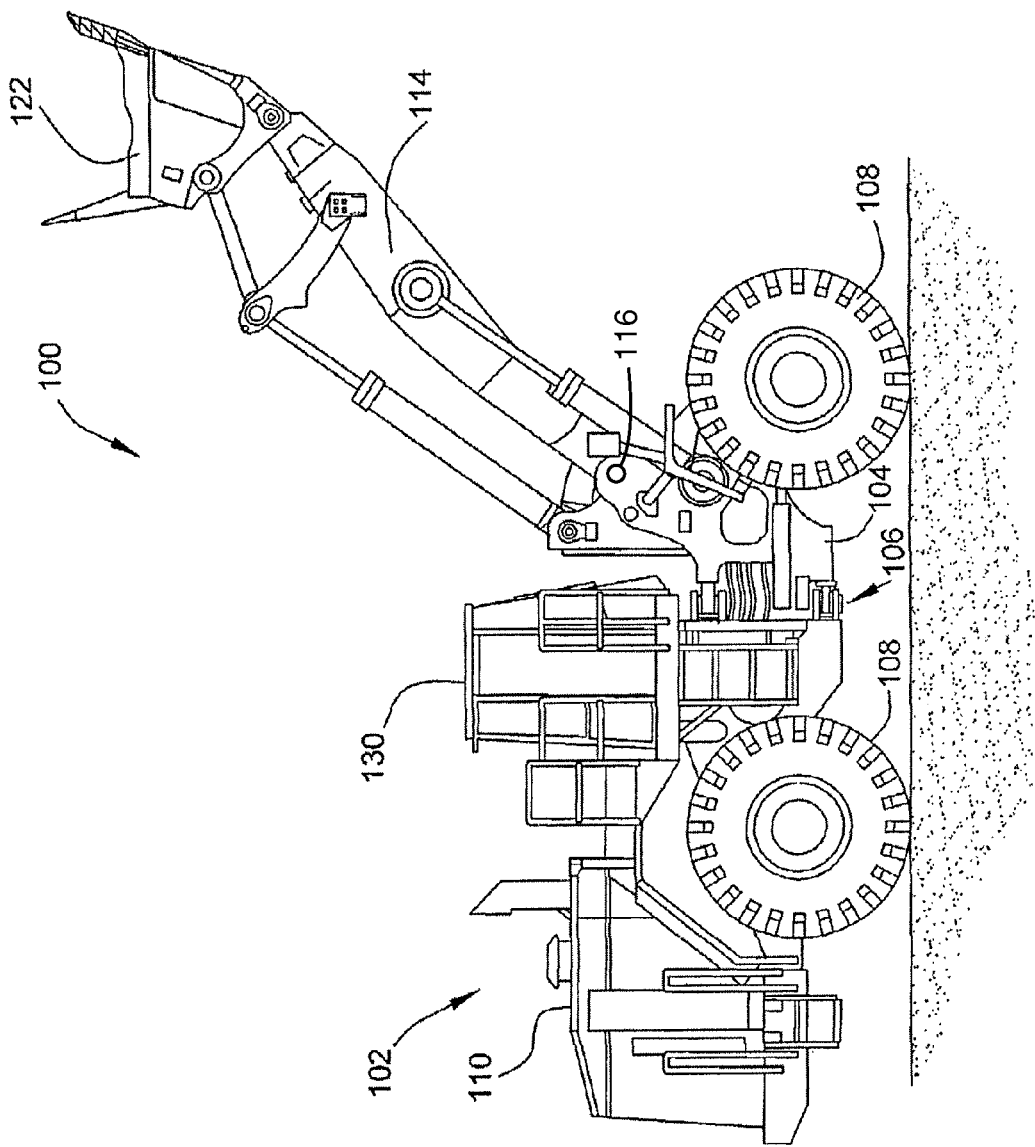
FIG. 1 is a schematic view of a machine in accordance with the disclosure.
Figure 2:
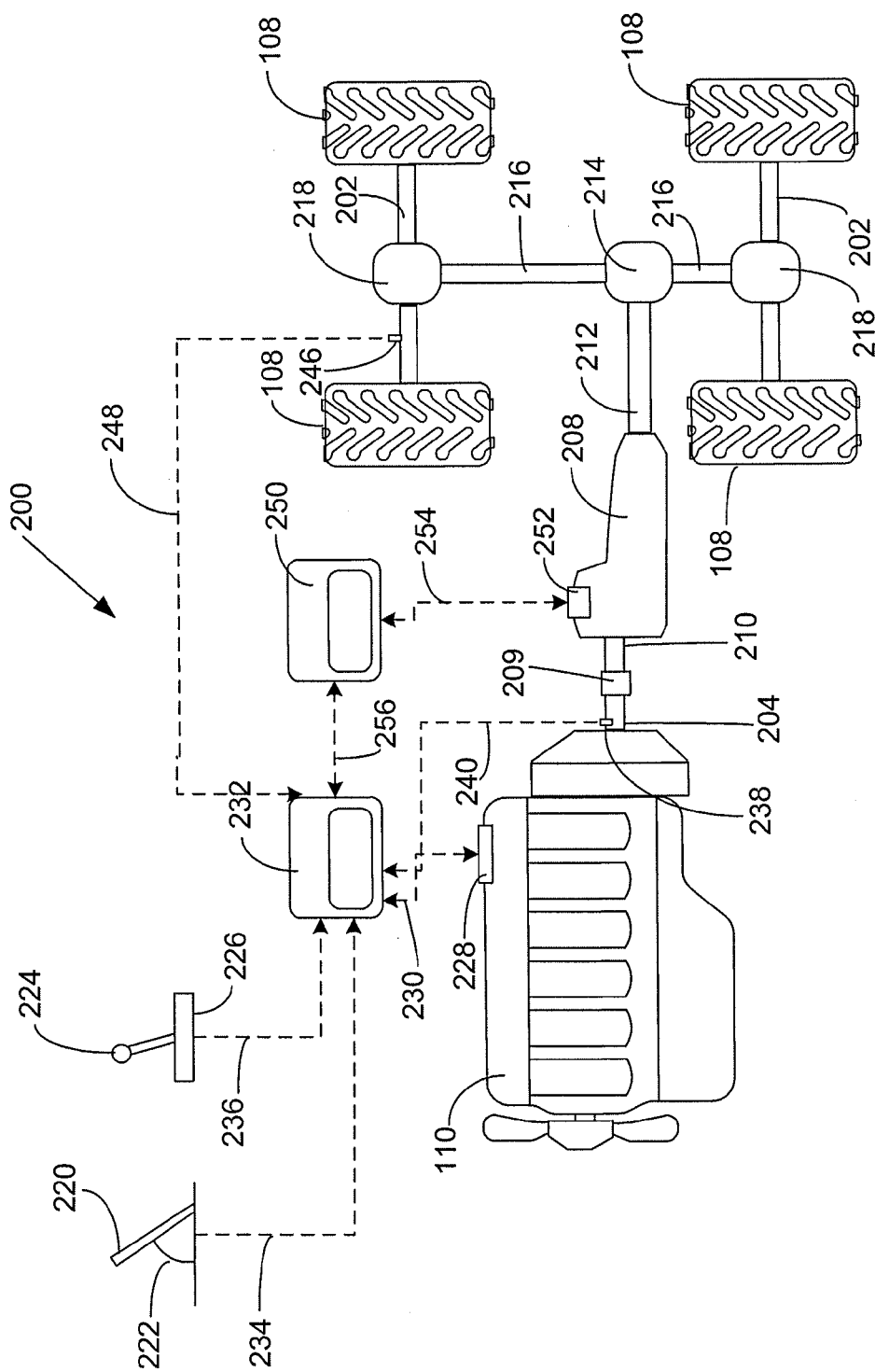
FIG. 2 is a schematic view of a powertrain for a machine in accordance with the disclosure.

FIG. 1 shows an outline of a wheel loader as one example of a vehicle or machine 100. FIG. 2 is a schematic of a powertrain 200 of the vehicle 100. In reference to these figures, the vehicle 100 includes an engine frame portion 102 connected to a non-engine frame portion 104 by an articulated joint 106. Each of the engine frame portion 102 and non-engine frame portion 104 includes a respective axle 202 connected to ground engaging members, in this case, a set of wheels 108. The vehicle 100 of the illustrated embodiment includes a work implement, which in this case is a bucket 122 connected at the end of a pair of lift arms 114 that are pivotally connected to the non-engine frame portion 104 of the vehicle 100 at a hinge 116.

The engine frame portion 102 includes the engine 110, which has an output shaft 204 connected to a transmission 208 via a connecting shaft 210 and a coupling 209. An output shaft 212 of the transmission 208 is connected to a splitter 214 that powers two drive shafts 216, one for each axle 202. The transmission 208 is configured to selectively transform an engine speed and torque provided from the engine 110 at the connecting shaft 210 to a variable speed and torque at the output shaft 212, which is then applied to drive the ground engaging members or wheels 108. The transmission 208 may include a variator connected to a gear set, as discussed later relative to FIGS. 3 and 4. Each drive shaft 216 transmits power to the wheels 118 via a respective differential 218 such that rotational power provided at the engine output shaft 204 is effectively transmitted to the wheels 108. Although two driven axles 202 are shown, a single axle or more than two axles may be used depending on the type of vehicle. Moreover, although wheels are shown, other types of ground engaging members, such as tracks, may be used.

Returning to FIG. 1, the vehicle 100 further includes an operator cab 130 that houses various machine control devices. As shown in FIG. 2, such devices may, for example, include an accelerator pedal 220 having an accelerator pedal sensor 222, and a gear selector lever 224 having a lever encoder 226. The accelerator pedal sensor 222 and lever encoder 226 may be configured to provide signals indicative of the desired ground speed of the vehicle 100 that is commanded by an operator during use.

As shown in FIG. 2, the engine 110 has an interface 228 that is connected to a communication channel 230 with an engine governor 232. The engine governor 232 operates to monitor and control the function of various engine systems, such as monitor sensor readings from various engine sensors, control engine speed and load output and so forth, by receiving information and transmitting commands to various engine components through the communication channel 230. As shown, the engine governor 232, or another controller connected to the governor 232, is further connected to various vehicle components that can control the operation of the engine.

In the illustrated embodiment, the governor 232 is an electronic controller that includes a processor operably associated with other electronic components such as a data storage device and the various communication channels. In the illustration of FIG. 2, a throttle communication channel 234 and a gear selection encoder communication channel 236 are connected to the governor 232 and configured to provide to the governor 232 information indicative of the operator's commands, such as the desired engine speed or load, the desired forward or reverse travel direction of the machine, a "neutral" or "park" setting of the machine transmission, and the like. It should be appreciated that additional or alternative connections between the governor 232 and the various engine and/or vehicle systems may be present but are not shown for simplicity.

The governor 232 may be further configured to receive information indicative of the operation of the remaining portion of the powertrain 200. In this way, for example, the governor 232 may be connected to an engine output shaft speed sensor 238 via an engine speed communication channel 240, to a vehicle ground speed sensor 246 via a ground speed communication channel 248, and to other sensors, which are not shown for simplicity.

The powertrain 200 further includes a transmission controller 250 that is configured to control the operation of the transmission 208. Accordingly, the transmission controller 250 is connected to an interface 252 of the transmission 208 via a transmission communication channel 254. The interface 252 may include structures that can selectively engage and disengage various gear sets of the transmission 208 in response to commands from the transmission controller 250, as well as provide information to the transmission controller 250 indicative of the current gear engagement state of the transmission 208, and other information, such as the power transmitted to the wheels 108 through the transmission 208, the speed of the output shaft 212, the speed of the connecting shaft 210, and the like. During operation, the transmission controller 250 may command gear changes to the transmission 208 based on, for example, predetermined connecting shaft 210 speed thresholds for up-shift and downshift changes. Such gear changes may include command signals provided to the variator for adjusting the relative speeds of incoming and outgoing gears, operating in a spinning idle state, where no engine rotation is transferred through the transmission, and other operating conditions. In some conditions, the variator may be commanded to assume a position in which a torque at the output shaft is maintained while the engine shaft is essentially de-coupled from the output shaft of the transmission. This type of torque "holding" position can be commanded when, for example, a wheel loader has sufficiently pushed itself against an aggregate pile and the operator wishes to hold that position while the bucket is loaded. As can be appreciated, the holding torque in such instance is required to prevent the rolling of the machine away from the pile.

Information for the coordinated control of the engine 110 and transmission 208 may be exchanged between the engine governor 232 and the transmission controller 250 via a data bus 256. Although the engine governor 232 and the transmission controller 250 are shown as separate components, it is contemplated that they may alternatively be integrated into a single control unit or separated into more than two control units. Thus, either of the engine governor 232 and/or the transmission controller 250 may be a single controller or may include more than one controller disposed to control various functions and/or features of a machine. For example, a master controller, used to control the overall operation and function of the machine, may be cooperatively implemented with a motor or engine controller, used to control the engine 110. In this embodiment, the terms "controller" or "governor" are meant to include one, two, or more controllers that may be associated with the machine 100 and that may cooperate in controlling various functions and operations of the machine 100 (FIG. 1). The functionality of these devices, while shown conceptually in the figures that follow to include various discrete functions for illustrative purposes only, may be implemented in hardware and/or software without regard to the discrete functionality shown. Accordingly, although various interfaces of the controller are described relative to components of the powertrain system in the figures that follow, such interfaces are not intended to limit the type and number of components that are connected, nor the number of controllers that are described.

Figure 3:
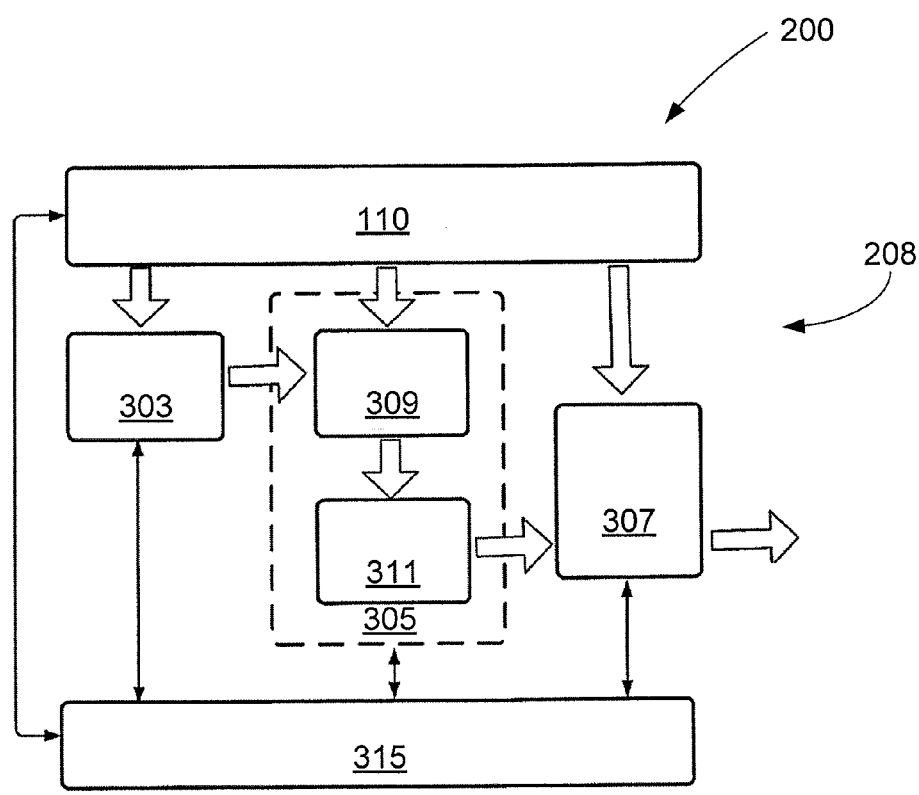
FIG. 3 is a block diagram of a powertrain in accordance with the disclosure.

A simplified schematic of the transmission 208 with the connections of the various components therein is shown in FIG. 3. The illustrated transmission 208 includes a variator 305 and transmission gears 307. In the illustrated embodiment, the variator 305 is a hydrostatic-type variator that includes a variator pump 309 and a variator motor 311. Although a hydraulic variator is shown and described here with respect to FIGS. 3 and 4, it is noted that any other type of variator such as mechanical- or electrical-based variators may be used.

Various examples of variators operating in conjunction with transmissions can be found in U.S. application Ser. Nos. 13/407,280 and 13/407,311, both of which are incorporated herein in their entirety by reference. In a representative example of such structures, output of the variator, output of the engine, and a transmission output member are connected respectively to one or more of the ring, planet, and/or sun gears of a planetary gear arrangement. During operation, the ring, planet, and sun gears are connected in various patterns to provide a plurality of forward and reverse gear ratios. Shifts between various forward and reverse gear ratios are carried out at a relative speed of about zero between the outgoing and incoming gears. To this end, the variator is used to adjust the speed of the gear to which it is coupled such that the combined speed yields a zero rotation speed in the transmission output member when the machine or vehicle is stationary notwithstanding the rotational input provided by the engine to one or more other gears. The variator thus operates at a variable speed, in two directions, while the powertrain is active. In this way, a transmission setting may include a command to a variator actuator that sets the relative speed and direction of the variator during operation.

Returning to FIG. 3, the engine 110, which in the illustrated embodiment acts as the prime mover for the system, supplies power to the transmission gears 307 and the variator pump 309 via direct input, for example, the shaft 210 (FIG. 2). The engine 110 may also mechanically drive components of the variator 305 in the known fashion. The engine 110 also is connected to and drives a main hydraulic pump 303. The main hydraulic pump 303 may be used to operate numerous components and systems of the machine such as actuators, work implements and the like. In the illustrated embodiment, the powertrain uses hydraulic power from the main hydraulic pump 303 to operate various functions of a propel system of the machine. The main hydraulic pump 303 supplies fluid via the fluid supply line to the variator 305, which is included within the transmission 208 (also see FIG. 2). The power output of the system is provided by the transmission gears 307. Mechanical power from the variator 305 and from the engine 110 are provided to a set of transmission gears 307. In this way, the set of transmission gears 307 receives dual power inputs, one from the variator 305 and the other from the engine 110.

During operation, the engine 110 drives the variator pump 309, which has a variable displacement capability and operates to circulate fluid through the variator motor 311. A controller 315 monitors and controls operation of the various systems and components that are associated therewith, as well as monitors and controls engine operation. Although illustrated as a single controller 315, the controller 315 may include two or more controllers, such as engine and transmission controllers 250, 232, or may operate in cooperation with other controllers, providing information to and receiving information from one or more other controllers. Further, while the system illustrated in FIG. 3 is a split torque system, it is contemplated that other types of systems may instead be used. For example, the disclosed principles will also provide benefits within a simple direct series hydrostatic ("hystat") system, where an engine-driven pump supplies fluid to operate a motor that is connected to the input or output side of the transmission.

During operation, the controller 315 receives operational data from the engine 110, variator 305, and transmission gears 307. The controller 315 provides operational control information to the engine 110 and controls the operation of the variator 305 and clutches or other devices (not shown) that engage and disengage one or more of the sets of transmission gears 307 in response to this data, and in accordance with user input and potentially other information related to operating goals and/or conditions. The control of all these components and systems is typically carried out based on command signals from the operator, which are provided in the form of a requested torque.

Under certain operating conditions, especially when external loads occur such as when a machine implement 122 engages a pile, control of a continuously variable transmission (CVTs) can advantageously include quick detection of transient torque events. For the purposes of this disclosure, the term "transient torque event" will include operating conditions in which swift torque changes are required to avoid or minimize engine underspeed. Detection of transient torque events, for example, when the bucket engages a pile, may be detected by any appropriate method or system. Transient torque events may result in a feedback torque that may be transmitted through the transmission. If the feedback torque is further transmitted to the engine, the torque may result in low engine lug issues, such as an engine underspeed or stalling. Feedback torque resulting from such a transient torque event may vary depending upon various factors such as the density and size of the pile, the material of the pile, ground traction of the machine, initial speed of the machine, weight of the machine and other factors. Exemplary systems and methods are disclosed, by way of example only, in U.S. application Ser. No. 13/484,632 filed May 31, 2012, which is incorporated herein in its entirety for everything disclosed therein.

The systems and methods for improving variator response disclosed herein control operation of the variator during transient torque events in a fashion that is less dependent on the particular rate of change of the operator commands. When using the described system, unpredictable operation that may depend on particular operator control inputs is avoided by performing transient variator control following of detection of a transient torque event. In this way, system accuracy and response time can be improved over existing control methodologies, especially when operating in extreme conditions, such as when the machine encounters a perceived immovable obstacle.

Figure 4:
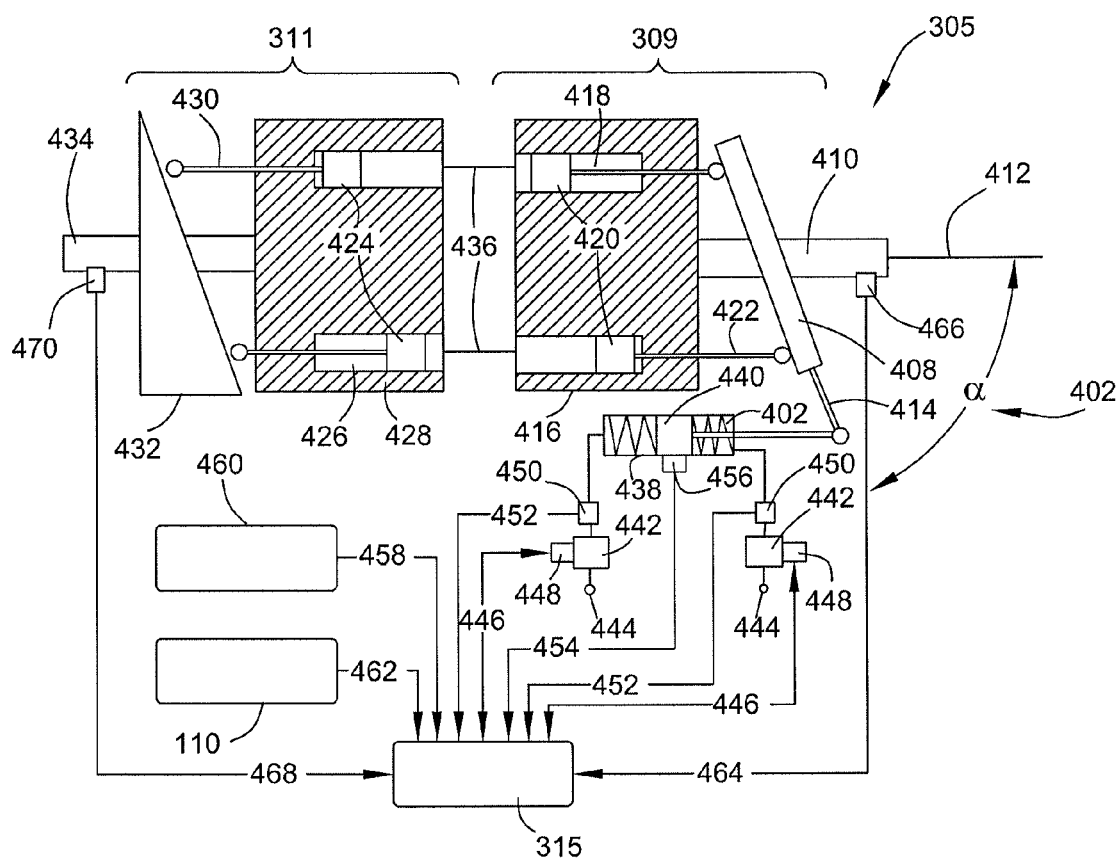
FIG. 4 is a schematic drawing of a variator control system in accordance with the disclosure.

To illustrate the structures associated with one embodiment of the present disclosure, a schematic drawing that includes a cross-section of a variator 305 is shown in FIG. 4. The variator 305 comprises a variator pump 309 and a variator motor 311. The variator pump 309 comprises a variable angle swashplate 408, whose angle is set by the swashplate actuator 402. In the illustrated embodiment, the swashplate 408 is pivotally connected to an input shaft 410 and disposed to rotate therewith. An angle, a, of the swashplate 408 relative to a centerline 412 of the input shaft 410 is adjustable as the actuator 402, which is embodied here as a linear actuator, changes positions and pushes or pulls on a two-bar linkage 414. Although a linear actuator having a linkage is shown, it is contemplated that other actuator types such as rotary actuators may be used. By applying a control pressure differential in a swashplate actuator 402, a variable output torque is provided from the variator motor 311.

In the simplified illustration of FIG. 4, the variator pump 309 includes a housing 416 that forms a plurality of bores 418. The bores 418 extend parallel to one another and are arranged at equal angles in a circular pattern around the drive shaft centerline 412. Each bore 418 reciprocally accepts a piston 420 that is connected to a rod 422 having a fixed length and being constrained to axially move along a single direction relative to the housing 416. The rods 422 slidably engage the swashplate 408 such that, as the swashplate 408 rotates at an angle relative to the input shaft 410, it causes the pistons 420 to reciprocate within the bores 418 and to create a plurality of reciprocating piston pumps that push fluid and pull fluid. Additional fluid circuit components such as fluid coolers, a fluid reservoir and the like have been omitted from the illustration of FIG. 4 for simplicity. The range of motion of the pistons within their respective bores, and thus the amount or volume of fluid moved thereby, depends on the angle of the swashplate. Other structures such as inlet and outlet valves corresponding to each bore 418, fluid inlet or outlet ports, fluid reservoirs, springs acting to return the pistons 420 to one position or the other, or the like are also not shown in FIG. 4 for simplicity.

The variator motor 311 is constructed in a similar fashion as the variator pump 309 to include a plurality of pistons 424, each disposed within a bore 426 formed within a variator motor housing 428. Connecting rods 430 relate the motor pistons 424 to a variator motor swashplate 432, which in the illustrated embodiment is shown to have a fixed angle but may alternatively have a variable angle. The variator motor swashplate 432 is fixed to rotate with an output shaft 434 such that the output shaft 434 is rotated when pressurized fluid is supplied to the motor bores 426. To this end, high pressure fluid lines 436 interconnect the bores 418 of the variator pump 309 with the bores 426 of the variator motor 311 for fluid transfer under a variable pressure and volume therebetween. Pressure sensors (not shown) associated with the high pressure fluid lines 436 are configured to provide pressure readings or pressure difference readings relative to fluid pressure present in those lines.

During operation, as the input shaft 410 is rotated, for example, by the engine 110 (FIG. 3), while the swashplate 408 of the variator pump 309 is disposed at an angle α other than perpendicular relative to the input shaft 410 centerline 412. That is, when the pump swashplate 408 is disposed at an angle α that is other than perpendicular to the input shaft 410 centerline 412, the pump pistons 420 are moved to create a pressurized fluid flow through the fluid lines 436. The pressure and/or flow of fluid provided through the fluid lines 436 depends on the inclination or angle of the variator pump swashplate 408. Fluid from the lines 436 causes the respective motor pistons 424 to move and thus the ends of the connecting rods 430 to slidably push and rotate the variator motor swashplate 432 causing the output shaft 434 to rotate. The speed and direction of rotation of the output shaft 434 depends on the angle α, which in turn depends on the position of the swashplate actuator 402 as previously described. The torque of the output shaft 434 varies with the net force that is applied to the variator pump swashplate 408. It should be appreciated that the fluid pressure within the high pressure fluid lines 436, and thus the force required to move the swashplate 408, will depend on the torque passing through the variator 305.

In the illustrated embodiment, the swashplate actuator 402 is embodied as a dual-acting piston that operates on a hydraulic pressure differential applied across two opposed piston faces. Specifically, a piston bore 438 slidably accepts a piston 440 that is biased towards a central position by two springs. A pressure difference of fluid applied on either side of the piston 440, along with spring forces by the springs, and a driven load applied through the variator pump 309 on the swashplate 408, will result in a net force experienced at the piston 440, which can be balanced for steady-state operation and be overcome in one direction or the other by appropriate adjustment of the pressure differential across the piston 440 when maintaining or changing the angle α of the swashplate 408. It is noted that although a double-headed piston is shown, any other hydraulic actuator configuration may be used, for example, separate cylinders pushing in two different directions, or a different type of actuator may be used such as an electric actuator.

When moving the actuator 402, fluid under pressure may be caused to enter or exit from a respective side of the piston 440. In the illustrated embodiment, fluid pressure acting in either side of the actuator piston 440 is regulated by a two electronic pressure regulator valves (ePRV) 442. Each ePRV 442 draws fluid from a pressurized fluid source 444 and shunts a sufficient portion of that fluid to a reservoir (not shown) to achieve a desired pressure at its outlet, i.e., within the bore 438 on the respective side of the piston 440. The pressurized fluid at the source 444 may be provided by the main hydraulic pump 303 (FIG. 3) or may alternatively be supplied by any other appropriate pumping means associated with the machine 100. Fluid shunted from each ePRV 442 is returned to a drain or reservoir (not shown).

Operation of the two ePRVs 442 is monitored and controlled by the controller 315 (also shown in FIG. 3) in the illustrated embodiment, although a different, standalone controller can be used. The controller 315 provides valve command signals 446 via appropriate communication lines to an actuator 448 associated with each ePRV 442. A pressure sensor 450 is disposed to monitor hydraulic fluid pressure at the outlet of each ePRV 442 and provide a pressure signal 452 to the controller 315. The controller 315 further receives a variator pump displacement signal 454 provided by a displacement sensor 456 associated with the actuator 402.

Although not directly a part of the variator 305, the illustration of FIG. 4 shows some additional inputs received by the controller 315. Specifically, the controller 315 receives an operator signal 458, which is provided by a control device 460 that is manually or automatically operated to set a ground travel speed and direction for a machine, for example, and an engine signal 462, which is indicative of various operating parameters of the engine 110. As illustrated in FIG. 2, the operator signal 458 may include, for example, signals based upon input from an accelerator pedal 220 by way of an accelerator pedal sensor 222 and a throttle communication channel 234, and/or based upon input from a gear selector lever 244 by way of a lever encoder 226 and a gear selection encoder communication channel 236. Other signals may also be used.

Specifically regarding the operation of the variator 305, the controller 315 receives an input speed signal 464 that is provided by an input speed sensor 466, and an output speed signal 468 that is provided by an output speed sensor 470. As shown, the input speed signal 464 is indicative of the input speed of the variator pump input shaft 410 and the output speed signal 468 is indicative of the output speed of the variator motor output shaft 434, but the speed of other rotating components within the variator 305 or the transmission gears 307 (FIG. 3) can be used instead or in addition to the illustrated arrangement.

The controller 315, based at least on the various inputs of the variator and the system in which it operates, is configured to provide appropriate commands to the ePRVs 442 that improve the torque response of the powertrain 200 (FIGS. 2 and 3) when a transient torque event is encountered in which swift torque changes are required to avoid or minimize engine underspeed. Such underspeeding may be likely to occur, for example, when a ripping machine encounters hard earth, a loader pushes against a pile with its bucket, and the like. According to this disclosure, transient torque events may be detected by any appropriate method or system. Two embodiments of the system and method for improving CVT transient torque response are disclosed in FIGS. 5 and 6. In each embodiment, when such a transient torque event is detected, the controller 315 commands maximum negative CVT output torque. The controller 315 then commands several increasing torque steps until the commanded torque equals the actual feedback torque. The torque steps may be accomplished through a shift-pulse and shift-ramp variator control strategy. In the second embodiment, illustrated in FIG. 6, if an engine stall condition is still detected when maximum negative CVT output torque is commanded, the controller 315 commands the disengagement of the clutches of the CVT to prevent a stall.

Figure 5:
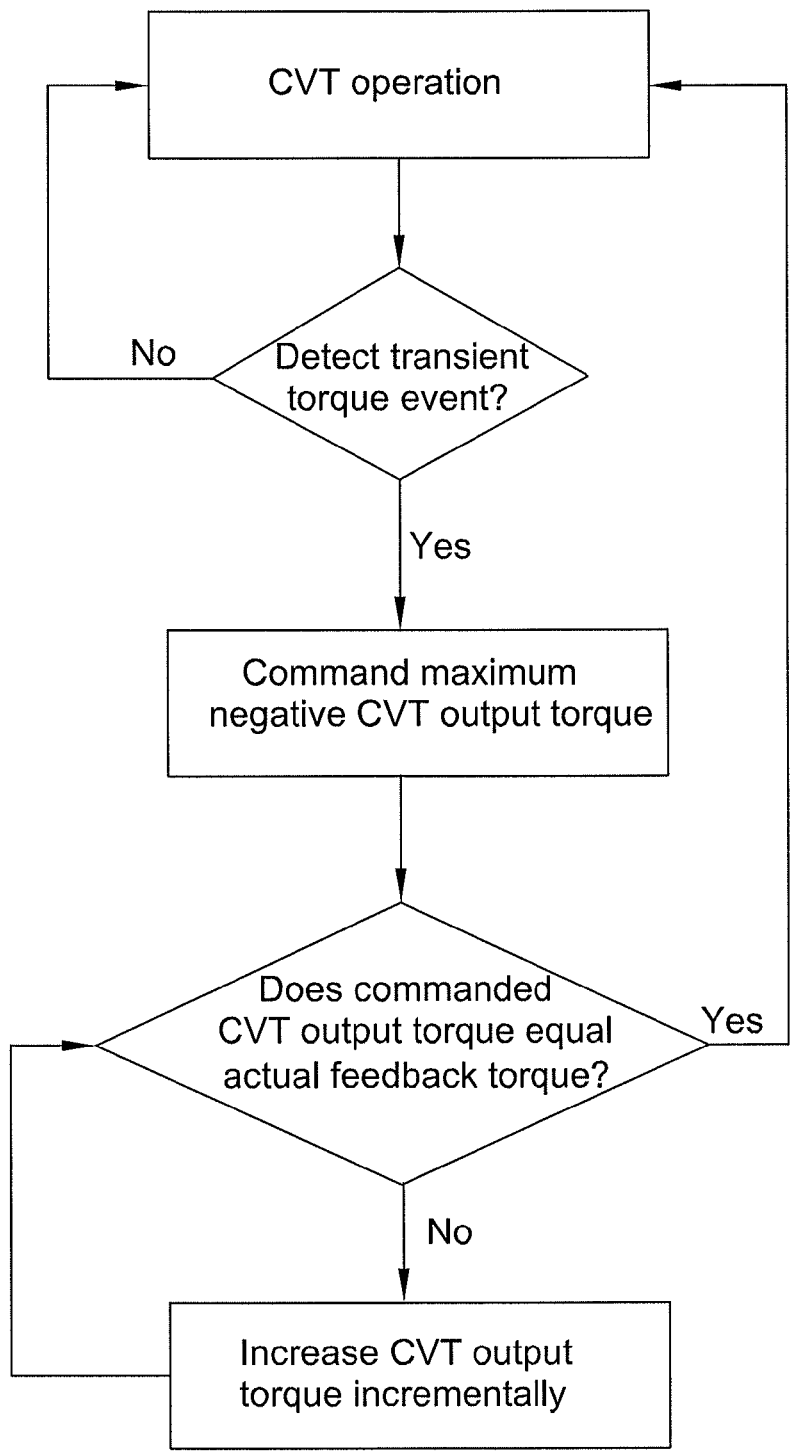
FIG. 5 is a flowchart for a method in accordance with the disclosure.

A flowchart of a system and method for improving the transient response of a variator 305 is illustrated in FIG. 5. As an initial matter, transient torque event may be detected by any appropriate system or method, as discussed above. When the transmission 208 encounters a transient torque event during operation of the machine 100, the controller 315 commands a maximum negative CVT output torque. Referring to FIG. 2, the controller 315 commands a maximum negative CVT output torque at output shaft 212. The controller 315 then increases the CVT output torque incrementally until such time as the commanded CVT output torque equals the actual feedback torque.

As illustrated in the powertrain 200 of FIG. 3, under the system and method, the controller 315 commands a maximum negative output torque from the transmission 308. This is accomplished by the variator 305 providing maximum negative output torque to the transmission 307, which, in turn provides maximum negative output torque from the transmission gears 307. The controller 315 then commands that the transmission output torque be incrementally increased until such time as the transmission output torque equals the feedback torque.

That is, referring to the powertrain 200 of FIG. 2, the controller 250 commands a maximum negative output torque from the transmission 208. After comparing the transmission output torque to the feedback torque, the controller 250 incrementally increases the transmission output torque from the maximum negative output torque until the transmission output torque at output shaft 212 is equal to the feedback torque.

Turning to the hydrostatic-type variator 305 of FIG. 4, the controller 315 may receive input from any appropriate source indicating that a transient torque event has occurred. For example, the controller 315 may receive input from the engine 110 by way of an engine signal. 462, or an operator signal 458 from a control device 460. Alternately or additionally, the controller 315 or another controller of the system may perform one or more steps to determine when a transient torques event has occurred.

When it is determined that a transient event has occurred, the controller 315 commands a maximum negative CVT output torque by commanding a maximum negative variator 305 output. In the embodiment illustrated in FIG. 4, the controller 315 commands the swashplate actuator 402 to move the swashplate 408 to a maximum negative swashplate angle α by providing corresponding instructive valve command signals 446 to the actuators 448 of the ePRVs 442 coupled to the actuator 402. In alternate designs of variators, similar signals would be commanded to instruct a similar maximum negative CVT output torque.

The controller 315 then determines whether the commanded CVT output torque is equal to the actual feedback torque as measured, for example, by the feedback torque at the transmission output shaft 212. It is to be understood that the term "equal to" as used in this disclosure is intended to include operation within a predetermined range. If the CVT output torque is equal to the feedback torque, the CVT continues to operate as commanded.

Conversely, if the CVT output torque is not equal to the feedback torque, the controller 315 commands an incremental increase the CVT output torque. That is, in the embodiment of FIG. 4, the controller 315 commands the swashplate actuator 402 to move the swashplate 408 a predetermined increment from the previously commanded maximum negative swashplate angle α by providing corresponding instructive valve command signals 446 to the actuators 448 of the ePRVs 442 coupled to the actuator 402. The predetermined increment may be based upon any appropriate methodology. In the illustrated embodiment, for example, a predetermined decrease in the swashplate angle α, or a movement of the two-bar linkage 414 by a given distance will result in a corresponding incremental increase in the CVT output torque. In alternate designs of variators, similar signals would be commanded to instruct a similar incremental increase in the CVT output torque. The controller 315 then again determines whether the resultant commanded CVT output torque is equal to the actual feedback torque. If, the resultant commanded CVT output torque is equal to the actual feedback torque, that is, equal to or within a predetermined range, the CVT continues to operate as commanded. If the resultant commanded CVT output torque, again, is not equal to the actual feedback torque, the process of incrementally increasing the CVT output torque is repeated until such time as the commanded CVT output torque is equal to the actual feedback torque. It will be understood that the increments may be the same in each incremental increase, or they may, for example, be reduced as the CVT output torque approaches the feedback torque. It will be further understood that adjustments to the CVT output torque may further include decreases in the CVT output torque if the CVT output torque is not at its maximum and it is determined that the CVT output torque is greater than the feedback torque.

Figure 6:
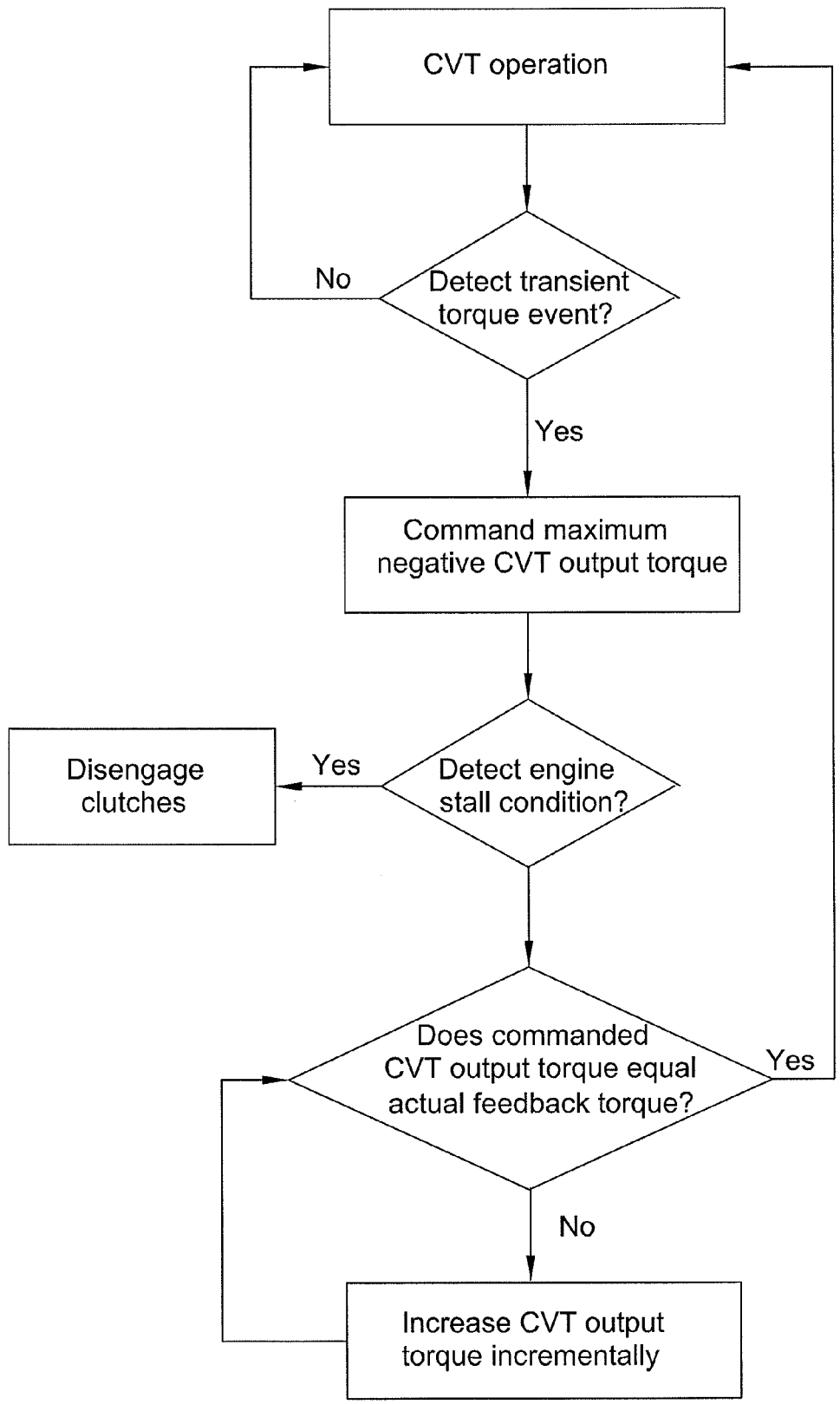
FIG. 6 is a flowchart for another method in accordance with the disclosure.

Turning to FIG. 6, the system and method may further include a fallback step to prevent an imminent stall of the engine 110. According to this system and method, in addition to the steps explained with regard to FIG. 5, the controller 315 determines by any appropriate method or system whether a stall of the engine is imminent. If a stall is determined to be imminent, the controller 315 provides a signal to the transmission 208 to disengage the clutches coupling the transmission gears 307 (see FIG. 3). In other words, if an engine stall is imminent, then the clutches of the transmission 208 are disengaged in order to decouple the transmission from the engine 110 to prevent a stall.

The controller 232, 250, 315 may include a processor (not shown) and a memory component (not shown). The processor may be microprocessors or other processors as known in the art. In some embodiments the processor may be made up of multiple processors. The processor may execute instructions for generating signals and controlling operations, such as the methods described in connection with FIGS. 1-6. Such instructions may be read into or incorporated into a computer readable medium, such as the memory component or provided external to processor. In alternative embodiments, hard-wired circuitry may be used in place of or in combination with software instructions to implement the method disclosed herein. Thus embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

The memory component may include any form of computer-readable media as described above. The memory component may include multiple memory components.

The controller 232, 250, 315 may be enclosed in a single housing. In alternative embodiments, the controller 232, 250, 315 may include a plurality of components operably connected and enclosed in a plurality of housings. The controller 232, 250, 315 may be an integral part of a control panel. In another embodiment, the controller 232, 250, 315 may be fixedly attached to the machine 100, the engine 110, a frame portion 102, 104, the powertrain 200, and/or the transmission 208, or in a location remote to the same.

INDUSTRIAL APPLICABILITY

The present disclosure is applicable in improving the operation and sociability of vehicles and machines having CVTs that operate in a torque-controlled fashion. The present disclosure may be applicable to powertrains having variators. More specifically, the disclosure may be applicable to hydraulically actuated variators.

Some embodiments of systems and methods may effectively control a transmission 208 to minimize and/or eliminate opportunity for an engine stall when torque transients are detected. Moreover, insofar as torque transients may affect machine and vehicle operation in many different contexts, for example, when a wheel loader encounters a pile or when a wheel of a passenger car hits a curb, the disclosed systems and methods may have broad applicability to many other types of machines, vehicles and powertrains in addition to those already described above.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for controlling a torque-controlled transmission in response to transient torque events caused by encountering an object that results in a feedback torque, comprising:
    commanding a maximum negative transmission output torque;
    comparing the commanded transmission output torque to the feedback torque to the transmission;
    determining if the commanded transmission output torque is equal to or within a predetermined range of the feedback torque to the transmission; and
    sequentially incrementally increasing the commanded transmission output torque if the commanded transmission output torque is not equal to or within the predetermined range of the feedback torque, and again determining if the commanded transmission output torque is equal to or within the predetermined range of the feedback torque until such time as the commanded transmission output torque is equal to or within the predetermined range of the feedback torque.

2. The method of claim 1 wherein the incremental increases in the commanded transmission output torque are of equal increments.

3. The method of claim 1 wherein the incremental increases in the commanded transmission output torque are dependent upon a difference between the commanded transmission output torque and the feedback torque.

4. The method of claim 3 wherein the incremental increases decrease in scope as a difference between the commanded output torque and the feedback torque decreases.

5. The method of claim 3 further including steps of detecting whether an engine stall condition exists, and disengaging at least one clutch of the transmission if an imminent engine stall condition is detected.

6. The method of claim 5 wherein the disengaging step includes disengaging all clutches of the transmission.

7. The method of claim 1 wherein the transmission is a continuously variable transmission.

8. The method of claim 7 wherein the transmission includes a variator including a swashplate, and the step of commanding a maximum negative transmission output torque includes adjusting the angle of the swashplate.

9. The method of claim 1 further including steps of detecting whether an engine stall condition exists, and disengaging at least one clutch of the transmission if an imminent engine stall condition is detected.

10. The method of claim 9 wherein the disengaging step includes disengaging all clutches of the transmission.

11. A powertrain having an engine connected to a transmission having an output torque and being adapted to drive ground engaging members, comprising:
 a controller configured to control operation of the transmission based on a desired output torque of the transmission in response to a transient torque event caused by encountering an object that results in a feedback torque, by, at least in part, commanding maximum negative transmission output torque, comparing the maximum negative transmission output torque to the feedback torque from the ground engaging members, and incrementally increasing the transmission output torque until such time as the transmission output torque is equal to or within a preset range of the feedback torque.

12. The powertrain of claim 11 wherein the transmission comprises a variator and a plurality of transmission gears, and the controller is adapted to command the variator to a maximum negative output torque in response to a transient torque event, and to incrementally increase the variator output torque.

13. The powertrain of claim 12 wherein the variator includes a variator pump having a swashplate, and the controller is adapted to command the variator to a maximum negative output in response to a transient torque event.

14. The powertrain of claim 11 further including an engine sensor adapted to provide a signal to the controller if an engine stall is imminent, and wherein the controller is further configured to disengage at least one clutch of the transmission if the signal is received that an engine stall is imminent.

15. The powertrain of claim 14 wherein the transmission comprises a variator and a plurality of transmission gears, and the controller is adapted to command the variator to a maximum negative output torque in response to a transient torque event, and to incrementally increase the variator output torque.

16. The powertrain of claim 14 wherein the variator includes a variator pump having a swashplate, and the controller is adapted to command the variator to a maximum negative output in response to a transient torque event.

17. The powertrain of claim 11 wherein the transient torque event includes an encounter with an obstacle wherein feedback torque is transmitted to the transmission via a coupling to the ground engaging members, and the controller is adapted to adjust the transmission output torque such that engine underspeed is avoided in response to said transient torque event.

18. A machine, comprising:
 a frame that supports an engine connected to a transmission, the transmission selectively transforming an input engine speed and engine torque to an output transmission speed and transmission torque, the transmission speed and torque being applied to a set of ground engaging members to propel the frame;
 a controller configured to control operation of the transmission based on a desired output torque of the transmission in response to a transient torque event caused by encountering an object that results in a feedback torque, by, at least in part, commanding maximum negative transmission output torque, comparing the maximum negative transmission output torque to the feedback torque from the ground engaging members, and incrementally increasing the transmission output torque until such time as the transmission output torque is equal to or within a preset range of the feedback torque.

19. The machine of claim 18, further including an engine sensor adapted to provide a signal to the controller if an engine stall is imminent, the transmission includes a plurality of gears and at least one clutch, and wherein the controller is further configured to disengage the at least one clutch of the transmission if the signal is received that an engine stall is imminent.

20. The machine of claim 19 wherein the transmission comprises a variator and a plurality of transmission gears, and the controller is adapted to command the variator to a maximum negative output torque in response to a transient torque event, and to incrementally increase the variator output torque.

* * * * *